Figure 1:
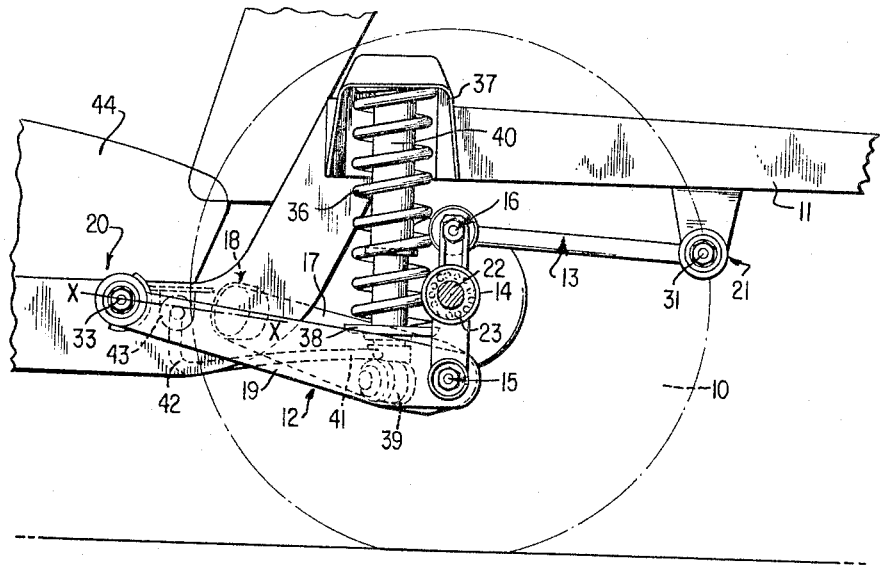

Oct. 11, 1966

F. H. VAN WINSEN 3,277,975

WHEEL SUSPENSION FOR RETARDING NOSE-DIVING AND PITCHING OF THE VEHICLE BODY

Filed Feb. 24, 1964

2 Sheets-Sheet 1

INVENTOR.
FRIEDRICH H. VAN WINSEN

BY

Dicke & Craig
ATTORNEYS.

Oct. 11, 1966   F. H. VAN WINSEN   3,277,975
WHEEL SUSPENSION FOR RETARDING NOSE-DIVING
AND PITCHING OF THE VEHICLE BODY
Filed Feb. 24, 1964                    2 Sheets-Sheet 2

INVENTOR.
FRIEDRICH H. VAN WINSEN
BY Dicke & Craig
ATTORNEYS.

United States Patent Office 3,277,975
Patented Oct. 11, 1966

3,277,975
WHEEL SUSPENSION FOR RETARDING NOSE-DIVING AND PITCHING OF THE VEHICLE BODY
Friedrich H. van Winsen, Kirchheim-Teck, Germany, assignor to Daimler-Benz Aktiengesellschaft, Stuttgart, Unterturkheim, Germany
Filed Feb. 24, 1964, Ser. No. 346,789
Claims priority, application Germany, Feb. 23, 1963, D 40,966
20 Claims. (Cl. 180—73)

The present invention relates to a wheel suspension, especially for the rear axle of motor vehicles, in which the wheel carrier is guided at the vehicle superstructure by means of two guide members of which one is directed forwardly from the wheel carrier and the other is directed rearwardly from the wheel carrier, and provides above all an improved roadability of the vehicle especially also during starting and braking. Simultaneously therewith, a reliable maintenance of the wheel track of the vehicle as well as the possibility of a low center of gravity and favorable spatial conditions within the area of the wheel axle are aimed at by the present invention.

A significant feature of the present invention accordingly consists in that one of the two guide members is constructed as inclined guide member with a swinging axis extending obliquely to the vehicle longitudinal axis. Preferably, the lower guide member is thereby directed forwardly from the wheel axle and is constructed as inclined guide member. Since the inclined guide member acts with a component of its spring movements as swinging half-axle, the advantages of the parallel guidance of the wheels, especially of a small change in wheel track are combined in an advantageous manner by such a wheel suspension with those of the swinging half-axle arrangement, especially of small change in camber of the wheels while driving through curves as well as of a slight curve tilting of the vehicle body.

Simultaneously therewith, there results the advantage that with a low location of the forwardly directed guide member the rear seat within the vehicle interior space remains practically unimpaired by the guide support of the guide members and, therefore, can be ararnged very low. The center of gravity of the entire vehicle can therefore be located also very low.

An undesirable appearance in the spring behavior of motor vehicles essentially resides in that the vehicle body or superstructure is pulled downwardly at the rear axle during acceleration of the vehicle by reason of the starting moment whereas, in contrast thereto, it is lifted during braking by the brake moment acting at the wheels. The starting moment is thereby produced by a resultant force acting in the axle center which is composed, on the one hand, of a thrust force acting in the driving direction and, on the other, of a pressure force directed upwardly at the rear axle and dependent on the vehicle weight, is directed forwardly and upwardly at a certain angle and acts always about the instantaneous center of the axle spring movement that is determined by the respective intersection of the longitudinal center lines of the two guide members, that is, the straight connecting lines of the two guide member joints of each guide member, in relation to the vertical longitudinal plane of the wheel carrier. In a similar manner, the braking moment is produced by the resultant force acting at the point of contact with the road surface or ground of the corresponding wheel which is composed, on the one hand, of a thrust force acting in a direction opposite to the normal driving direction and, on the other, of a weight, is directed rearwardly downwardly at a certain angle from the point of contact with the road and acts always about the aforementioned instantaneous center. The torques produced thereby have as consequence with the constructions known heretofore, especially with thrust or longitudinal guide members that the aforementioned nose-diving, nodding or pitching movements of the vehicle occur.

Admittedly, the spring system of the vehicle acts in opposition to these undesired nose-diving, nodding or pitching movements of the body of the vehicle. However, the spring system, which again is undesirable, has to be designed and dimensioned very hard as a rule in order to establish within a spring stroke that is not excessively large, an equilibrium position between the spring force and the pitching or nodding force insofar as such an equilibrium position can be achieved at all which, for example, with individual thrust guide members is not the case without further measures.

It has now been discovered that two oppositely directed guide members are favorable for the reason that the nose-dive, nodding or pitching moment progressively decreases both during starting and upward spring deflection of the axle, to be referred to hereinafter also as inward spring deflection, as well as also during braking and downward spring deflection of the axle, to be referred to hereinafter also as outward spring movement, in that the lever arm of the aforementioned resultant drive or brake force decreases relatively rapidly in relation to the instantaneous center which is disposed at infinity with parallelly disposed guide members and which approaches during inward or outward spring movements of the axle from opposite sides. As a rule, the equilibrium position is attainable thereby already after a limited spring stroke. However, if the guide member, as usual, is disposed horizontally in the center spring position of the axle, then a substantial nose-diving, nodding or pitching of the vehicle during sudden starting or braking is also unavoidable in this case.

This nose-diving, nodding or pitching, however, may be eliminated partly or substantially completely if the guide members, according to a further feature of the present invention are in the center spring position thereof, with normal load, directed forwardly upwardly in the direction of the resultant starting force or the resultant brake force or approximately in the direction of these forces so that these forces cannot exert or practically do not exert a nose-diving, nodding or pitching movement. Possibly the equilibrium condition between spring system and nodding or pitching moment can be attained already after a short spring stroke. Furthermore, the possibility of exceeding this equilibrium condition, that is an oppositely acting starting or brake moment, is very desirable under certain circumstances at least over a substantial part of the entire spring stroke of the axle.

According to a further feature of the present invention one of the two guide members is pivotally connected with the wheel carrier about a transverse axis, but is connected therewith in a corner-rigid or angle-stiff manner and, for example, as fork-shaped or triangular guide member is supported at the vehicle superstructure over a relatively large width in the vehicle transverse direction whereas the other guide member connects the wheel carrier with the vehicle superstructure in a universally yielding manner, that is, elastically in all directions. The first-mentioned guide member serving as supporting guide structure and as lower and forwardly directed guide arm is preferably constructed as fork-shaped or triangular guide member, whereby one of the two arms thereof is constructed rigid and the other arm is elastic in bending and/or trosion and the joint connecting the guide member with the wheel carrier is arranged between the rigid guide arm and the wheel carrier. Preferably elastic bearing elements are interposed in the joints of the guide members, especially in the joints connecting the guide members with the vehicle superstructure which bearer elements enable a certain longitudinal spring movement in relation to the vehicle superstructure.

In a particularly preferred embodiment of the present invention the elastic bearing elements, preferably rubber cushions, are arranged with a construction of the one guide member as fork-shaped or triangular guide member, especially as inclined guide member, in such a manner that the elastic bearing elements interposed in the bearing joints of the two bearing arms of the guide member as constructed with the axes of largest yieldingness arranged at an angle to each other, whereby, for example, the elastic element in proximity to the wheel has its largest yieldingness approximately perpendicularly to the associated guide arm whereas the elastic element remote from the wheel has its largest yieldingness obliquely to the guide arm associated therewith. This arrangement provides the possibility by reason of the axial component occurring in the bearing joint remote from the wheel of a transverse force acting at the wheel, to equalize at least partially by simple transverse displacement of the guide member within the elasticity of the rubber the deflection of the guide member that would otherwise occur and therewith of the wheel about a vertical axis and therewith to avoid either completely or partly any undesired toe-in of the wheels.

The guide member which is directed forwardly transversely from the axle may be pivotally connected in an advantageous manner at the vehicle superstructure below the rear vehicle seat whereby the springs and shock absorbers may be supported at the longitudinal arms of this guide member to the rear of the rear seat.

In a particularly simple and advantageous construction of the present invention one of the two guide members, especially the upper rearwardly directed guide member, may be constructed simultaneously as stabilizer by means of which oppositely directed stroke movements of the wheels are additionally spring-supported while unidirectional stroke movements of the wheels remain unaffected thereby.

Accordingly, it is an object of the present invention to provide the wheel suspension, and more particularly a rear wheel suspension which effectively eliminates the drawbacks and shortcomings encountered with the prior art constructions and which is simple in construction yet highly effective to realize without difficulties the aforementioned characteristics.

Another object of the present invention resides in the provision of a wheel suspension, especially for the rear axle of motor vehicles which improves the roadability of the vehicle, particularly also during starting and braking.

A further object of the present invention resides in the provision of a wheel suspension, particularly for the rear axle of motor vehicles which not only substantially eliminates the pitching or nose-diving movements of the vehicle due to accelerating and decelerating forces but at the same time permits a reliable maintenance of the wheel track.

Still a further object of the present invention resides in the provision of a wheel suspension, particularly for the rear axle of motor vehicles which permits the realization of a relatively low center of gravity while at the same time improving the space conditions and spatial requirements particularly for the wheel axle and its guide means at the superstructure.

Still another object of the present invention resides in the provision of a wheel suspension which combines the advantages obtainable by parallel guidance of the wheels with those obtainable with swinging half-axle suspensions.

A further object of the present invention resides in the provision of a wheel suspension, especially for the rear axle of a motor vehicle, which affords simultaneously slight change in wheel track, slight change in camber and toe-in and slight body tilting when driving through curves.

Another object of the present invention resides in the provision of a wheel suspension which eliminates the nodding, nose-dive and pitching movements of the vehicle without requiring excessively hard springs.

A further object of the present invention resides in the provision of a wheel suspension, especially for the rear axle of motor vehicles which brings about a position of equilibrium already after a relatively short spring stroke.

A still further object of the present invention resides in the provision of a wheel suspension, particularly for the rear axle of motor vehicles, which eliminates either partly or completely any steering deflections of the wheels about a substantially vertical axis as is normally encountered with the prior art suspensions.

Figure 2:
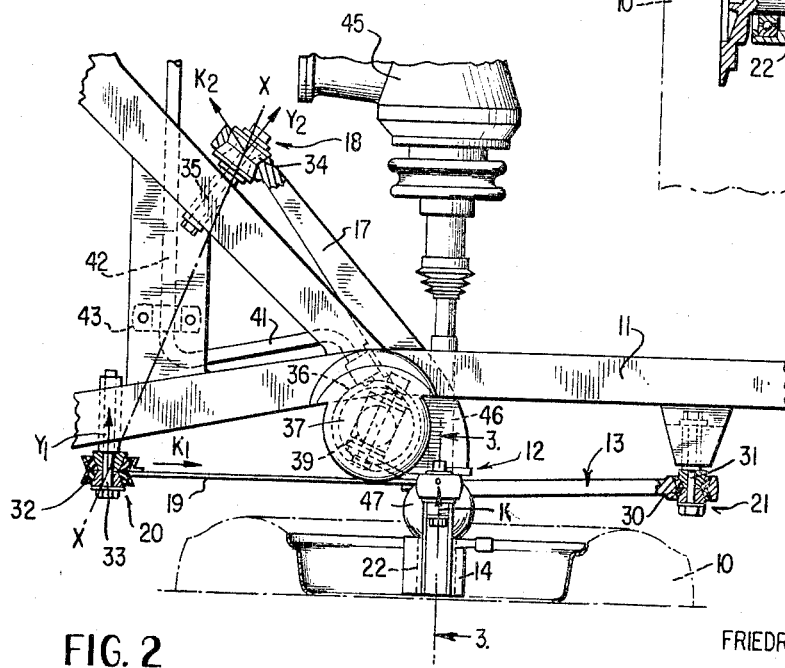

These and other objects, features and advantages of the present invention will become more obvious from the following description when taken in connection with the accompanying drawing which shows, for purposes of illustration only, two embodiments in accordance with the present invention, and wherein:

FIGURE 1 is a partial side elevational view of a first embodiment of a wheel suspension according to the present invention, FIGURE 2 is a partial plan view of the wheel suspension of FIGURE 1, whereby the joints connecting the guide members with the vehicle superstructure are shown partly in cross section.

Figure 3:
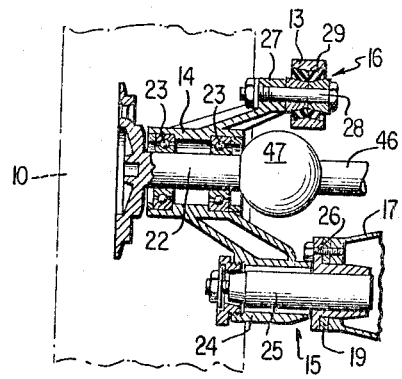
Figure 4:
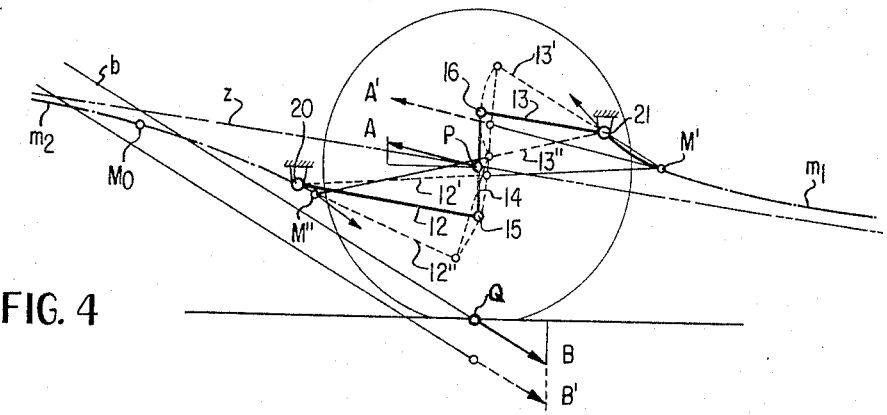
Figure 5:
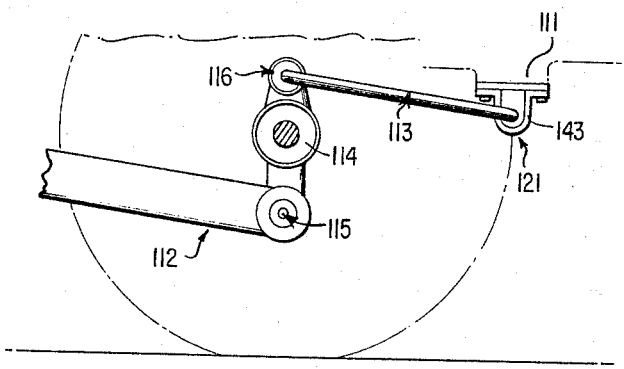
Figure 6:
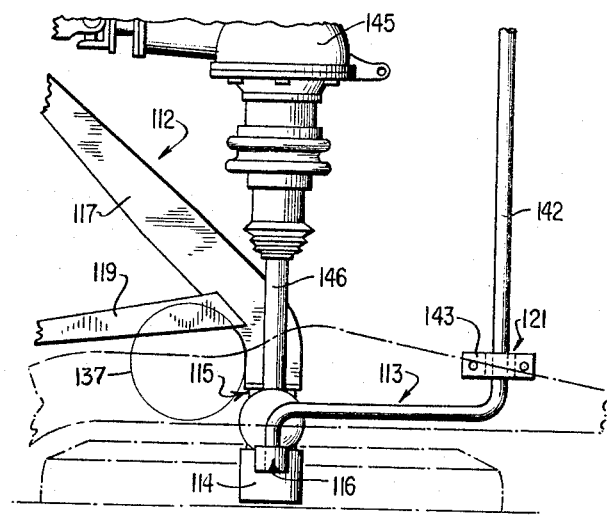

FIGURE 3 is a cross-sectional view, on an enlarged scale, taken along line 3—3 of FIGURE 2, FIGURE 4 is a vector diagram explanatory of the wheel suspension shown in FIGURE 1, FIGURE 5 is a partial side elevational view of a second modified embodiment of a wheel suspension in accordance with the present invention, and FIGURE 6 is a partial plan view of the embodiment of the wheel suspension illustrated in FIGURE 5.

Referring now to the drawing wherein like reference numerals are used throughout the various views to designate like parts, and more particularly to FIGURES 1 to 3, the rear wheels 10 are guided at the frame 11 in the spring direction by the two guide members one of which is generally designated by reference numeral 12 and the other by reference numeral 13. For that purpose the wheel 10 is rotatably supported in a wheel carrier 14 which is pivotally connected, on the one hand, with the lower guide member 12 by means of a joint generally designated by reference numeral 15 and, on the other, with the upper guide member 13 by means of a joint generally designated by reference numeral 16. The lower guide member 12 is constructed of fork shape and consists of a rigid arm 17 which is pivotally connected at the frame 11 by means of the joint generally designated by reference numeral 18 as well as of an arm 19 elastic in bending and torsion which is pivotally connected with the frame 11 of the vehicle superstructure by a joint generally designated by reference numeral 20. The upper guide member 13 is pivotally supported at the frame 11 by means of a joint generally designated by reference numeral 21.

As may be seen particularly clearly from FIGURE 3, the wheel carrier 14 within which is supported the wheel axle 22 rigidly connected with the wheel, by means of two ball bearings 23, is constructed at the lower end thereof as joint sleeve 24 within which is rotatably supported a pin 25 securely connected by threaded means with the guide arm 17. The pin 25 is connected with the guide arm 17 by means of bolts 26 under interposition of the torsionally elastic guide arm 19.

At the upper end thereof a joint bolt 28 is inserted into the upper bearing eye 27 of the wheel carrier 14 for purposes of forming the joint 16, and the guide member 13 is supported on the joint bolt 28 by the interposition of conical rubber rings 29. The guide member 13 is mounted at the other end thereof in a similar manner over a bearing pin 31 (FIG. 2) provided at the frame 11 by the interposition of conical rubber rings 30 for purposes of forming the joint 21. A similar pivotal connection connects the torsionally elastic guide arm 19 with the frame 11 in that the end thereon near the frame which, for example, is welded to the main part of the guide arm 19 constructed in a leaf-spring like manner, supported at the vehicle frame 11 on a joint pin 33 by the interposition of conical rubber rings 32.

The rigid guide arm 17 rotatably connected with the wheel carrier 14 about the axis of the joint bolt 25, that is, about an axis perpendicular to the vehicle longitudinal direction, is also supported on a joint bolt 35 secured at the frame 11 of the vehicle superstructure by the interposition of conical rubber rings 34.

Coil springs 36 serve for purposes of spring-supporting the wheels; the coil springs 36 are supported at the upper end thereof against a bracket or mount 37 at the vehicle frame 11 and with the lower end thereof against a spring abutment 38 which is connected by means of joint 39 with the rigid guide arm 17. A telescopic shock absorber 40 is accommodated within the coil spring 36 which may form simultaneously a guide means for the coil spring 36 against lateral deflections thereof, and whose lower portion is supported together with the spring abutment 38 and whose upper sleeve-shaped portion is supported at the upper abutment 37, for example, by the interposition of rubber cushions.

The bent arm 41 of a torsion rod stabilizer 42 is connected with rigid arm 17 of the guide member 12; the torsion rod stabilizer 42 is rotatably supported about a transverse vehicle axis within bearing 43 at the frame 11 of the vehicle superstructure. The joints 20 and 18 of the vehicle guide member 12 as well as also the stabilizer 42 are, as shown in particular in FIGURE 1, arranged underneath the rear seat 44 of the passenger motor vehicle.

The drive of the wheel axle 22 of each wheel of the rear axle takes place, for example, from an engine arranged in the usual manner in the forward vehicle part by way of a change-speed gear, a cardan shaft and a rear axle gear 45 which is suspended at the frame 11, preferably by the interposition of rubber cushions, and which drives the wheels 10 by means of double jointed shafts 46. The wheel axle 22 is driven by the shaft 46 through a universal drive joint 47. The entire rear axle suspension is, of course, formed by two mirror-image-like suspension of which only one is shown in FIGURE 2.

The behavior of the wheel suspension during starting and braking will now be explained in greater detail by reference to FIGURE 4. As may be seen from this figure, the guide members 12 and 13 are directed toward opposite sides from the vertical transverse plane passing through the wheel centers of opposite wheels. The forwardly directed guide member 12 forms thereby a lower guide member disposed below the wheel centers whereas the rearwardly directed guide members 13 forms an upper guide member disposed above the wheel centers. Both guide members 12 and 13 are parallel to one another in the illustrated spring center position, as viewed in side view, and are arranged at an inclination rising from the rear toward the front. The instantaneous center for the spring movement of the wheel carrier 14 therefore lies in the illustrated condition at infinity. If the wheel 10 is spring deflected upwardly, then the instantaneous center determined by the respective intersection of the two guide members or the extensions thereof moves along the curve $m_1$ in the direction of the arrow whereas with a spring deflection in the downward direction the instantaneous center moves along the curve $m_2$ in the direction of the arrow. Thus, for example, the instantaneous center is at M' with the two guide members in the position 12' and 13' thereof, and in the position M'' with the two guide members in the positions 12'' and 13'' thereof. The straight line z parallel to the guide members 12 and 13 thereby forms the asymptote to the curves $m_1$ and $m_2$ of the instantaneous centers.

During starting of the vehicle a forwardly directed horizontal force and a vertical force resulting from the load of the weight on the axle occur in the center point P of the wheel carrier 14 which produce a resultant starting force A. Since this resultant force A has a stronger inclination to the horizontal than the straight line z parallel to the guide members 12 and 13, a moment is exerted on the wheel carrier 14 which seeks to approach the wheel 10 to the frame 11 or seeks to lower the latter, and more particularly for such length of time until the direction of the resultant force which is lifted with the inward spring deflection, passes through the associated instantaneous center which, for example, is the case in the position A' of the resultant force and with the instantaneous center at M' as the inersection of the straight lines 12' and 13'. Since the springs 36 oppose this movement, an equilibrium position, however, is achieved already prior thereto so that only a slight lowering movement of the frame 11 takes place. Upon exceeding this equilibrium position a torque is produced in the opposite sense.

By further approaching the guide members 12 and 13 to the parallel lines to the resultant force A in the spring center position of the wheel, the lowering movement of the frame during starting can be still further decreased.

A similar action takes place during braking. In that case, the resultant brake force B is produced at the point of contact Q with the ground of the braked wheel from a rearwardly directed horizontal force and from a vertical force produced by the load of the weight on the wheel. The brake force B, with an instantaneous center disposed in FIGURE 4 to the left of the straight line b of the brake force along the curve $m_2$, at first exerts a downwardly pulling moment (in FIGURE 4 in the clockwise direction) on the wheel carrier 14 or a lifting moment on the frame 11, and more particularly for such length of time until the instantaneous center displaced during outward or downward spring deflection of the wheel in the direction of the arrow along the curve $m_2$ intersects the simultaneously downwardly moving straight line b of the brake force and therewith a brake equalization of about 100% is achieved, for example, at $M_0$. Therebeyond the brake equalization amounts to over 100%, for example, with a spring stroke in which the guide members 12 and 13 assume the positions 12'' and 13'' and the instantaneous center is located at M'' as intersection of the straight lines 12'' and 13'' determined by the position. Consequently, a lifting moment (in the counterclockwise direction as viewed in FIGURE 4) is exerted on the wheel carrier 14 or a lowering moment on the vehicle superstructure 11 which is desirable in principle. However, also in this case the wheel spring system effects that the brake equalization is attained already sooner than explained above.

As can be seen particularly clearly from FIGURE 2, the bearing joints 20 and 18 of the two arms of the guide member 12 are offset with respect to one another in the driving direction. The straight connecting line x—x which connects the bearing joints 20 and 18 with one anohter thereby extends obliquely toward the rear in a direction toward the longitudinal center plane of the vehicle so that the guide member 12, taken as a whole, is able to effectively swing upwardly and downwardly as inclined guide member about this obliquely disposed axis x—x. The bearing pins 33 and 35 are not arranged coaxial to the axis x—x but at an angle with respect thereto. If a transverse force K occurs at the wheel 10, then this force becomes effective as a tension force $K_1$ in the bearing joint 20 and as a pressure force $K_2$ in the bearing joint 18. If now the axes of these two bearing joints were to coincide with the swinging axis x—x of the guide member 12, then the rubber ring 32 would be compressed rearwardly and radially to the swinging axis x—x and *the rubber ring 34 forwardly and radially to the swinging axis x—x.* The guide member 12 and therewith also the wheel would thereby undergo a corresponding rotation about a vertical axis in the counterclockwise direction as viewed in FIGURE 2 which would impair the driving safety. By the arrangement of the bearing pins 33 and 35 of the bearing joints at an angle to the swinging axis x—x, however, a force component is produced in the direction x—x by the force $K_2$ which effects simultaneously with a form change of the rubber rings 32 and 34 an axial displacement of the arms 19 and 17 on the pins 33 and 35 toward the longitudinal center plane of the vehicle in the direction of the arrows $y_1$ and $y_2$ which oppose the aforementioned rotation of the guide member 12 in the clockwise direction as viewed in FIGURE 2 so that a longitudinal spring movement of the wheel by reason of the rubber rings 32 and 34 is realized without or only with a slight change in the toe-in of the wheel.

The embodiment according ot FIGURES 5 and 6 differs from the embodiment described hereinabove essentially in that the lower guide member generally designated by reference numeral 112 connected with the wheel carrier 114 by a joint 115 consists of two rigid guide arms 117 and 119 securely connected with one another whereas the upper guide member generally designated by reference numeral 113 connected with the wheel carrier 114 by a joint 116 is constructed as the bent end of a stabilizer 142 whose bearing 143 forms the pivotal connecting place generally designated by reference numeral 121 between the upper guide member and the vehicle frame 111. Bearing 143 is similar to the double-conically shaped rubber bushing means 29 and 30 illustrated in FIGURES 2 and 3, but its connection to the vehicle frame and guide member is reversed, that is, the outer casing of the bearing 143 is fastened to the fixed part of the vehicle and the bent end of stabilizer 142 which also acts as the upper guide member 113 passes through and is bonded to the rubber bushings. A spring device 37 which is structurally and functionally similar to the spring device 37 to 40 of the species of FIGURES 1–3 is incorporated in the suspension linkage in the manner explained in connection with FIGURES 1–3.

As to the rest, the operation of the wheel suspension of FIGURES 5 and 6 is, in principle, the same as that of FIGURES 1 to 4. The drive of the wheels takes place by way of an axle gear 145 and an axle shaft 146 which is operatively connected with the wheel by a universal joint in a manner similar as in FIGURE 3.

Possibly it also suffices to arrange only one of the two joint axes 33 and 35 at an angle to the straight line x—x. For example, with the arrangement of the joint axis 33 in the direction $y_1$, the joint axis 35 may extend in the direction of the straight line x—x. However, it is most effective within the meaning of the described effect, if both joint axes form an angle to the straight line x—x, approximately as shown in the illustrated arrangement.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:
1. A wheel suspension, especially for the rear axle of motor vehicles having a vehicle superstructure and a wheel carrier for each wheel of the respective axle, comprising:
   means for suspending each wheel carrier from the vehicle superstructure including two oppositely directed guide means pivotally connected to opposite ends of a respective wheel carrier for guiding said wheel carrier at said vehicle superstructure,
   one of said wheel guide means being constructed at least in part as an inclined guide member lying in a vertical longitudinal plane through said wheel carrier and having a swinging axis extending obliquely to the vehicle longitudinal axis,
   and both of said wheel guide means being arranged in the center spring position of the vehicle so as to be inclined upwardly in the vehicle forward direction.

2. A wheel suspension, especially for the rear axle of motor vehicles having a vehicle superstructure and a wheel carrier for each wheel of the respective axle, comprising:
   means for suspending each wheel carrier from the vehicle superstructure including two oppositely directed guide means pivotally connected to opposite ends of respective wheel carrier for guiding said wheel carrier at said vehicle superstructure,
   and one of said wheel guide means being constructed at least in part as an inclined guide member lying in a vertical longitudinal plane through said wheel carrier and having a swinging axis extending obliquely to the vehicle longitudinal axis, and
   both of said wheel guide means being arranged in the center spring position of the vehicle so as to be inclined upwardly in the vehicle forward direction,
   said guide means also having such a length and inclination in the center position of the spring stroke that during a downward spring movement of the axle the direction of the brake force acting at the point of contact of the wheel with the ground extends substantially through the instantaneous center of the axle movement determined by the intersection of the center lines of the guide means in such a manner that at least in a last part of the downward spring stroke a moment is produced that seeks to lower the vehicle superstructure at the rear thereof.

3. A wheel suspension, especially for the rear axle of motor vehicles having a vehicle superstructure and a wheel carrier for each wheel of the respective axle, comprising:
   means for suspending each wheel carrier from the vehicle superstructure including two oppositely directed guide means pivotally connected to opposite ends of a respective wheel carrier for guiding said wheel carrier at said vehicle superstructure,
   said two wheel guide means being disposed one above the other,
   the upper of the two wheel guide means extending rearwardly and the lower wheel guide means extending forwardly,
   and the lower one of said wheel guide means being constructed at least in part as an inclined guide member lying in a vertical longitudinal plane through said wheel carrier and having a swinging axis extending obliquely to the vehicle longitudinal axis, and
   both of said wheel guide means being arranged in the center spring position of the vehicle so as to be inclined upwardly in the vehicle forward direction,
   said wheel guide means having such a length and inclination in the center position of the spring stroke that during the upward spring movement of the axle the direction of the accelerating force acting in the axle center extends substantially through the instantaneous center of the axle movement determined by the intersection of the center lines of the guide means in such a manner that at least within a last part of the upward spring stroke a moment is produced which seeks to lift the vehicle superstructure at the rear thereof,
   said guide means also having such a length and inclination in the center position of the spring stroke that during a downward spring movement of the axle the direction of the brake force acting at the point of contact of the wheel with the ground extends substantially through the instantaneous center of the axle movement determined by the intersection of the center lines of the guide means in such a manner that at least in a last part of the downward spring stroke a moment is produced that seeks to lower the vehicle superstructure at the rear thereof.

4. A wheel suspension, especially for the rear axle of motor vehicles having a vehicle superstructure and a wheel carrier for each wheel of the respective axle, comprising:
- means for suspending each wheel carrier from the vehicle superstructure including two oppositely directed guide means for pivotally connected to opposite ends of a respective wheel carrier for guiding said wheel carrier at said vehicle superstructure,
- one of said wheel guide means being constructed at least in part as an inclined guide member lying in a vertical longitudinal plane through said wheel carrier and having a swinging axis extending obliquely to the vehicle longitudinal axis,
- and both of said wheel guide means being arranged in the center spring position of the vehicle so as to be inclined upwardly in the vehicle forward direction,
- said wheel guide means having such a length and inclination in the center position of the spring stroke that during the upward spring movement of the axle the direction of the accelerating force acting in the axle center extends substantially through the instantaneous center of the axle movement determined by the intersection of the center lines of the guide means in such a manner that at least within a last part of the upward spring stroke a moment is produced which seeks to lift the vehicle superstructure at the rear thereof.

5. A wheel suspension, especially for the rear axle of motor vehicles having a vehicle superstructure and a wheel carrier for each wheel of the respective axle, comprising:
- means for suspending each wheel carrier from the vehicle superstructure including two oppositely directed guide means pivotally connected to opposite ends of a respective wheel carrier for guiding said wheel carrier at said vehicle superstructure,
- one of said wheel guide means being constructed at least in part as an inclined guide member lying in a vertical longitudinal plane through said wheel carrier and having a swinging axis extending obliquely to the vehicle longitudinal axis,
- and both of said wheel guide means being arranged in the center spring position of the vehicle so as to be inclined upwardly in the vehicle forward direction,
- said wheel guide means having such a length and inclination in the center position of the spring stroke that during the upward spring movement of the axle the direction of the accelerating force acting in the axle center extends substantially through the instantaneous center of the axle movement determined by the intersection of the center lines of the guide means in such a manner that at least within a last part of the upward spring stroke a moment is produced which seeks to lift the vehicle supestucture at the rear thereof,
- said guide means also having such a length and inclination in the center position of the spring stroke that during a downward spring movement of the axle the direction of the brake force acting at the point of contact of the wheel with the ground substantially extends through the instantaneous center of the axle movement determined by the intersection of the center lines of the guide means in such a manner that at least in a last part of the downward spring stroke a moment is produced that seeks to lower the vehicle superstructure at the rear thereof.

6. A wheel suspension, especially for the rear axle of motor vehicles having a vehicle superstructure and a wheel carrier for each wheel of the respective axle, comprising:
- means for suspending each wheel carrier from the vehicle superstructure including two oppositely directed guide means pivotally connected to opposite ends of a respective wheel carrier for guiding said wheel carrier at said vehicle superstructure,
- one of said wheel guide means being constructed at least in part as an inclined guide member lying in a vertical longitudinal plane through said wheel carrier and having a swinging axis extending obliquely to the vehicle longitudinal axis,
- and both of said wheel guide means being arranged in the center spring position of the vehicle so as to be inclined upwardly in the vehicle forward direction,
- means operatively connecting one of the guide means with said wheel carrier so as to pivot about a cross axis while being connected with said wheel carrier in a corner stiff manner,
- means supporting the said one guide means which is constructed as approximately triangular guide member at the vehicle superstructure over a relatively large width in the vehicle transverse direction,
- the other wheel guide means operatively connecting the wheel carrier with said vehicle superstructure in a universally yielding manner.

7. A wheel suspension, especially for the rear axle of motor vehicles having a vehicle superstructure and a wheel carrier for each wheel of the respective axle, comprising:
- means for suspending each wheel carrier from the vehicle superstructure including two oppositely directed guide means pivotally connected to opposite ends of a respective wheel carrier for guiding said wheel carrier at said vehicle superstructure,
- one of said wheel guide means being constructed at least in part as an inclined guide member lying in a vertical longitudinal plane through said wheel carrier and having a swinging axis extending obliquely to the vehicle longitudinal axis,
- and both of said wheel guide means being arranged in the center spring position of the vehicle so as to be inclined upwardly in the vehicle forward direction,
- means operatively connecting one of the guide means with said wheel carrier so as to pivot about a cross axis while being connected with said wheel carrier in a corner stiff manner,
- means supporting the said one guide means which is constructed as approximately triangular guide member at the vehicle superstructure over a relatively large width in the vehicle transverse direction,
- the other wheel guide means operatively connecting the wheel carrier with said vehicle superstructure in a universally yielding manner,
- the said one guide means constructed as approximately triangular guide member having two arm portions, one of said arm portions being constructed rigid and the other arm portion, securely connected with said one arm portion, being constructed elastic in bending and torsion, and joint means operatively connecting the said one wheel guide means with said wheel carrier and operatively arranged between the rigid arm portion and the wheel carrier.

8. A wheel suspension, especially for the rear axle of motor vehicles having a vehicle superstructure and a wheel carrier for each wheel of the respective axle, comprising:
- means for suspending each wheel carrier from the vehicle superstructure including two oppositely directed guide means pivotally connected to opposite ends of a respective wheel carrier for guiding said wheel carrier at said vehicle superstructure,
- one of said wheel guide means being constructed at least in part as an inclined guide member lying in a vertical longitudinal plane through said wheel carrier and having a swinging axis extending obliquely to the vehicle longitudinal axis,
- and both of said wheel guide means being arranged in the center spring position of the vehicle so as to be inclined upwardly in the vehicle forward direction,
- said wheel guide means having such a length and inclination in the center position of the spring stroke that during the upward spring movement of the axle the direction of the accelerating force acting in the axle center extends substantially through the instantaneous center of the axle movement determined by the intersection of the center lines of the guide means in such a manner that at least within a last part of the upward spring stroke a moment is produced which seeks to lift the vehicle superstructure at the rear thereof, said guide means also having such a length and inclination in the center position of the spring stroke that during a downward spring movement of the axle the direction of the brake force acting at the point of contact of the wheel with the ground substantially extends through the instantaneous center of the axle movement determined by the intersection of the center lines of the guide means in such a manner that at least in a last part of the downward spring stroke a moment is produced that seeks to lower the vehicle superstructure at the rear thereof, means operatively connecting one of the guide means with said wheel carrier so as to pivot about a cross axis while being connected with said wheel carrier in a corner stiff manner, means supporting the said one guide means which is constructed as approximately triangular guide member at the vehicle superstructure over a relatively large width in the vehicle transverse direction, the other wheel guide means operatively connecting the wheel carrier with said vehicle superstructure in a universally yielding manner, the said one guide means constructed as approximately triangular guide member having two arm portions, one of said arm portions being constructed rigid and the other arm portion, securely connected with said one arm portion, being constructed elastic in bending and torsion, and joint means operatively connecting the said one wheel guide means with said wheel carrier and operatively arranged between the rigid arm portion and the wheel carrier.

9. A wheel suspension, especially for the rear axle of motor vehicles having a vehicle superstructure and a wheel carrier for each wheel of the respective axle, comprising:

means for suspending each wheel carrier from the vehicle superstructure including two oppositely directed guide means pivotally connected to opposite ends of a respective wheel carrier for guiding said wheel carrier at said vehicle superstructure, said two wheel guide means being disposed one above the other, the upper of the two wheel guide means extending rearwardly and the lower wheel guide means extending forwardly, the lower one of said wheel guide means being constructed at least in part as an inclined guide member lying in a vertical longitudinal plane through said wheel carrier and having a swinging axis extending obliquely to the vehicle longitudinal axis, and both of said wheel guide means being arranged in the center spring position of the vehicle so as to be inclined upward in the vehicle forward direction, said wheel guide means having such a length and inclination in the center position of the spring stroke that during the upward spring movement of the axle the direction of the accelerating force acting in the axle center extends substantially through the instantaneous center of the axle movement determined by the intersection of the center lines of the guide means in such a manner that at least within a last part of the upward spring stroke a moment is produced which seeks to lift the vehicle superstructure at the rear thereof, said guide means also having such a length and inclination in the center position of the spring stroke that during a downward spring movement of the axle the direction of the brake force acting at the point of contact of the wheel with the ground substantially extends through the instantaneous center of the axle movement determined by the intersection of the center lines of the guide means in such a manner that at least in a last part of the downward spring stroke a moment is produced that seeks to lower the vehicle superstructure at the rear thereof, means operatively connecting one of the guide means with said wheel carrier so as to pivot about a cross axis while being connected with said wheel carrier in a corner stiff manner, means supporting the said one guide means which is constructed as approximately triangular guide member at the vehicle superstructure over a relatively large width in the vehicle transverse direction, the other wheel guide means operatively connecting the wheel carrier with said vehicle superstructure in a universally yielding manner, the said one guide means constructed as approximately triangular guide member having two arm portions, one of said arm portions being constructed rigid and the other arm portion, securely connected with said one arm portion, being constructed elastic in bending and torsion, and joint means operatively connecting the said one wheel guide means with said wheel carrier and operatively arranged between the right arm portion and the wheel carrier.

10. A wheel suspension, especially for the rear axle of motor vehicles having a vehicle superstructure and a wheel carrier for each wheel of the respective axle, comprising:

means for suspending each wheel carrier from the vehicle superstructure including two oppositely directed guide means pivotally connected to opposite ends of a respective wheel carrier for guilding said wheel carrier at said vehicle superstructure, said two wheel guide means being disposed one above the other, the upper of the two wheel guide means extending rearwardly and the lower wheel guide means extending forwardly, and the lower one of said wheel guide means being constructed at least in part as an inclined guide member lying in a vertical longitudinal plane through said wheel carrier and having a swinging axis extending obliquely to the vehicle longitudinal axis, said wheel guide means being arranged in the center spring position of the vehicle so as to be inclined upwardly in the vehicle forward direction, said wheel guide means having such a length and inclination in the center position of the spring stroke that during the upward spring movement of the axle the direction of the accelerating force acting in the axle center extends substantially through the instantaneous center of the axle movement determined by the intersection of the center lines of the guide means in such a manner that at least within a last part of the upward spring stroke moment is produced which seeks to lift the vehicle superstructure at the rear thereof, said guide means also having such a length and inclination in the center position of the spring stroke that during a downward spring movement of the axle the direction of the brake force acting at the point of contact of the wheel with the ground extends substantially through the instantaneous center of the axle movement determined by the intersection of the center lines of the guide means in such a manner that at least in a last part of the downward spring stroke a moment is produced that seeks to lower the vehicle superstructure at the rear thereof, means operatively connecting one of the guide means with said wheel carrier so as to pivot about a cross axis while being connected with said wheel carrier in a corner stiff manner, means supporting the said one guide means which is constructed as approximately triangular guide member at the vehicle superstructure over a relatively large width in the vehicle transverse direction, the one guide means constructed as triangular guide member having two arm portions, one of said arm portions being constructed rigid and the other arm portion, securely connected with said one arm portion, being constructed elastic in bending and torsion, and joint means operatively connecting said one wheel guide means with said wheel carrier and arranged between the rigid arm portion and the wheel carrier, and bearing joint means for supporting said wheel guide means at said vehicle superstructure including elastic bearing means interposed therebetween, said elastic bearing means being constructed with axes of maximum yieldingness deviating from the straight line connecting the two bearing joints and arranged at an angle to one another.

11. A wheel suspension, especially for the rear axle of motor vehicles having a vehicle superstructure and a wheel carrier for each wheel of a respective axle, comprising:

means for suspending said axle from the vehicle superstructure including two oppositely directed guide means for guiding each wheel carrier at said vehicle superstructure, one of said two guide means being of approximately triangular construction having two guide arm portions, one of said guide arm portions lying in a vertical longitudinal plane through said wheel carrier, and both of said wheel guide means being arranged in the center spring position of the vehicle so as to be inclined upwardly in the vehicle forward direction, joint means for supporting said wheel guide means at said vehicle superstructure including elastic bearing means interposed therebetween, the joint axes of the joint means connecting the two guide arm portions with the vehicle superstructure each extending at an angle to the driving direction of the vehicle, and the elastic bearing means in the two joint means for the two guide arm portions being constructed with axes of maximum yieldingness deviating from the straight line connecting the said two bearing joint means and arranged at an angle to one another.

12. A wheel suspension, especially for the rear axle of motor vehicles having a vehicle superstructure and a wheel carrier for each wheel of a respective axle, comprising:

means for suspending said axle from the vehicle superstructure including two oppositely directed guide means for guiding each wheel carrier at said vehicle superstructure, one of said two guide means being of approximately triangular construction having two guide arm portions, one of said guide arm portions lying in a vertical longitudinal plane through said wheel carrier, and both of said wheel guide means being arranged in the center spring position of the vehicle so as to be inclined upwardly in the vehicle forward direction, and joint means for supporting said wheel guide means at said vehicle superstructure including elastic bearing means interposed therebetween, the joint axes of the joint means connecting the two guide arm portions with the vehicle superstructure each extending at an angle to the driving direction of the vehicle, and the elastic bearing means in the two joint means for the two guide arm portions being constructed with axes of maximum yieldingness deviating from the straight line connecting the said two bearing joint means and arranged at an angle to one another, and the elastic bearing means in the joint means for the two guide arm portions being constructed as double-conical rubber bushings, the bearing means thereof within the bearing joint means disposed in proximity to the wheel having an axis extending approximately transversely to the vehicle longitudinal axis and approximately perpendicularly to the guide arm portion while the elastic bearing means in the bearing joint means of the guide arm portion remote from the wheel is so arranged that its axis subtends with the longitudinal center line of the corresponding guide arm portion a larger acute angle than with the connecting line of the two bearing joint means.

13. A wheel suspension, especially for the rear axle of motor vehicles having a vehicle superstructure and a wheel carrier for each wheel of a respective axle, comprising:

means for suspending said axle from the vehicle superstructure including two oppositely directed guide means for guiding each wheel carrier at said vehicle superstructure, and both of said wheel guide means being arranged in the center spring position of the vehicle so as to be inclined upwardly in the vehicle forward direction, and joint means for supporting said wheel guide means at said vehicle superstructure including elastic bearing means interposed therebetween, one of the inclined guide means consisting of two guide arm portions being constructed as inclined, forwardly directed, relatively low guide member while the other guide means is constructed as rearwardly directed, relatively high guide member, and spring means including shock absorber means supported at the lower of said two guide means.

14. A wheel suspension, especially for the rear axle of motor vehicles having a vehicle superstructure and a wheel carrier for each wheel of a respective axle, comprising:

means for suspending said axle from the vehicle superstructure including two oppositely directed guide means pivotally connected to opposite ends of a respective wheel carrier for guiding said wheel carrier at said vehicle superstructure, one of said two guide means being constructed at least in part as an inclined guide member lying in a vertical longitudinal plane through said wheel carrier and having a swinging axis extending obliquely to the vehicle longitudinal axis, and both of said wheel guide means being arranged in the center spring position of the vehicle so as to be inclined upwardly in the vehicle forward direction, and joint means for supporting said wheel guide means at said vehicle superstructure including elastic bearing means interposed therebetween, one of the inclined guide means consisting of two guide arm portions being constructed as inclined, forwardly directed, relatively low guide member while the other guide means is constructed as a rearwardly directed, relatively high guide member.

15. A wheel suspension, especially for the rear axle of motor vehicles having a vehicle superstructure and a wheel carrier for each wheel of a respective axle, comprising:

means for suspending said axle from the vehicle superstructure including two oppositely directed guide means for guiding each wheel carrier at said vehicle superstructure, one of said two guide means being of approximately triangular construction having two guide arm portions, one of said two guide means being constructed at least in part as an inclined guide member lying in a vertical longitudinal plane through said wheel carrier and having a swinging axis extending obliquely to the vehicle longitudinal axis, and both of said wheel guide means being arranged in the center spring position of the vehicle so as to be inclined upwardly in the vehicle forward direction, and joint means for supporting said wheel guide means at said vehicle superstructure including elastic bearing means interposed therebetween, the joint axes of the joint means connecting the two guide arm portions with the vehicle superstructure each extending at an angle to the driving direction of the vehicle, and the elastic bearing means in the two joint means for the two guide arm portions being constructed with axes of maximum yieldingness deviating from the straight line connecting the said two bearing joint means and arranged at an angle to one another, and the elastic bearing means in the joint means for the two guide arm portions being constructed as double-conical rubber bushings, the bearing means thereof within the bearing joint means disposed in proximity to the wheel having an axis extending approximately transversely to the vehicle longitudinal axis and approximately perpendicularly to the guide arm portion while the elastic bearing means in the bearing joint means of the guide arm portion remote from the wheel is so arranged that its axis subtends with the longitudinal center line of the corresponding guide arm portion a larger acute angle than with the connecting line of the two bearing joint means, one of the inclined guide means consisting of two guide arm portions being constructed as inclined, forwardly directed, relatively low guide member while the other guide means is constructed as a rearwardly directed, relatively high guide member, and spring means including shock absorber means supported at the lower of said two guide means.

16. A wheel suspension, especially for the rear axle of motor vehicles having a vehicle superstructure and a wheel carrier for each wheel of a respective axle, comprising:

means for suspending the axle from said vehicle superstructure including two oppositely directed guide means for guiding a respective wheel carrier at said vehicle superstructure, one of said wheel guide means being constructed as inclined guide member having a swinging axis extending obliquely to the vehicle longitudinal axis, and the other wheel guide means connecting the wheel carrier with the vehicle superstructure in a universally elastic manner, joint means for supporting said wheel guide means at said vehicle superstructure including elastic bearing means interposed therebetween, said elastic bearing means for the two guide arms being constructed with axes of maximum yieldingness deviating from the straight line connecting the two bearing joint means thereof and arranged at an angle to one another, the elastic bearing means for said two guide arms being constructed as double-conical rubber bushings, the bearing means within the bearing joint means for the guide arm disposed in proximity to the wheel having an axis extending approximately transversely to the vehicle longitudinal axis and approximately perpendicularly to the respective guide arm while the elastic bearing means in the bearing point means of the guide arm portion remote from the wheel is so arranged that its axis subtends with the longitudinal center line of the corresponding guide arm a larger acute angle than with the connecting line of the two bearing point means thereof, the other guide means connecting said wheel carrier with the vehicle superstructure universally elastically being simultaneously constructed as elastically constructed guide arm of a transversely arranged torsion spring forming a stabilizer, and double-conically shaped rubber bushing means operatively connecting the torsion spring of said other wheel guide means with the vehicle superstructure.

17. A wheel suspension, especially for the rear axle of motor vehicles having a vehicle superstructure and a wheel carrier for each wheel of a respective axle, comprising:

means for suspending the axle from said vehicle superstructure including two oppositely directed guide means for guiding a respective wheel carrier at said vehicle superstructure, said two wheel guide means being disposed one above the other, and the upper wheel guide means extends rearwardly while the lower wheel guide means extends forwardly.

the lower one of said wheel guide means being constructed as an inclined guide member having a swinging axis extending obliquely to the vehicle longitudinal axis, the inclined guide member having two guide arms and the other wheel guide means connecting the wheel carrier with the vehicle superstructure in a universally elastic manner, both of said wheel guide means being arranged in the center spring position of the vehicle so as to rise in the forward direction, joint means for supporting said wheel guide means at said vehicle superstructure including elastic bearing means interposed therebetween, said elastic bearing means for the two guide arms being constructed with axes of maximum yieldingness deviating from the straight line connecting the two bearing joint means thereof and arranged at an angle to one another, the elastic bearing means for said two guide means being constructed as double-conical rubber bushings, the bearing means within the bearing joint means for the guide arm disposed in proximity to the wheel having an axis extending approximately transversely to the vehicle longitudinal axis and approximately perpendicularly to the respective guide arm while the elastic bearing means in the bearing joint means of the guide arm portion remote from the wheel is so arranged that its axis subtends with the longitudinal center line of the corresponding guide arm a larger acute angle than with the connecting line of the two bearing joint means thereof, and spring means supported at the lower of said two guide means, the other guide means connecting said wheel carrier with the vehicle superstructure universally elastically being simultaneously constructed as elastically constructed guide arm of a transversely arranged torsion spring forming a stabilizer, and double-conically shaped rubber bushing means operatively connecting the torsion spring of said other wheel guide means with the vehicle superstructure.

18. A wheel suspension, especially for the rear axle of motor vehicles having a vehicle superstructure and a wheel carrier for each wheel of a respective axle, comprising:

means for suspending the axles from the vehicle superstructure including two oppositely directed guide means for guiding a respective wheel carrier at said vehicle superstructure, one of said wheel guide means being constructed at least in part as an inclined guide member lying in a vertical longitudinal plane through said wheel carrier and having two guide arms and provided with a swinging axis extending obliquely to the vehicle longitudinal axis, said wheel carrier including a bearing sleeve means carrying the wheel axle member and including two bearing arms offset in the upward and downward direction with respect to a drive shaft drivingly connecting the wheel axle member by way of a driving joint, one of said bearing arms being provided with a bearing eye receiving therein a joint pin securely arranged at said one wheel guide means whereas the other bearing arm is operatively connected with the other guide means by the interposition of elastic means, the supporting guide arm of the two-armed guide means being flangedly connected at the lower bearing arm of the wheel carrier by the interposition of the connecting end of the other guide arm.

19. A wheel suspension, especially for the rear axle of motor vehicles having a vehicle superstructure and a wheel carrier for each wheel of a respective axle, comprising:

means for suspending the axle from the vehicle superstructure including two oppositely directed guide means for guiding a respective wheel carrier at said vehicle superstructure, said two wheel guide means being disposed one above the other, the lower one of said wheel guide means being constructed at least in part as an inclined guide member lying in a vertical longitudinal plane through said wheel carrier and having a swinging axis extending obliquely to the vehicle longitudinal axis, the upper of the two wheel guide means extending rearwardly and the lower wheel guide means extending forwardly, and both of said wheel guide means being arranged in the center spring position of the vehicle so as to be upwardly inclined in the vehicle forward direction, said wheel carrier including a bearing sleeve means carrying the wheel axle member and including two bearing arms offset in the upward and downward direction with respect to a drive shaft drivingly connecting the wheel axle member by way of a driving joint, the lower one of said bearing arms being provided with a bearing eye receiving therein a joint pin securely arranged at said one wheel guide means whereas the other upper bearing arm is operatively connected with the other guide means by the interposition of elastic means.

20. A wheel suspension, especially for the rear axle of motor vehicles having a vehicle superstructure and a wheel carrier for each wheel of a respective axle, comprising:

means for suspending the axle from the vehicle superstructure including two oppositely directed guide means for guiding a respective wheel carrier at said vehicle superstrucutre, said two wheel guide means being disposed one above the other, the lower one of said wheel guide means being constructed at least in part as an inclined guide member lying in a vertical longitudinal plane through said wheel carrier and having two guide arms and provided with a swinging axis extending obliquely to the vehicle longitudinal axis, the upper of the two wheel guide means extending rearwardly and the lower wheel guide means extending forwardly, and both of said wheel guide means being arranged in the center spring position of the vehicle so as to be upwardly inclined in the vehicle forward direction, said wheel carrier including a bearing sleeve means carrying the wheel axle member and including two bearing arms offset in the upward and downward direction with respect to a drive shaft drivingly connecting the wheel axle member by way of a driving joint, the lower one of said bearing arms being provided with a bearing eye receiving therein a joint pin securely arranged at said one wheel guide means whereas the other upper bearing arm is operatively connected with the other guide means by the interposition of elastic means, the supporting guide arm of the two-armed guide means being flangedly connected at the lower bearing arm of the wheel carrier by the interposition of the connecting end of the other guide arm and by the interposition of washers.

References Cited by the Examiner

UNITED STATES PATENTS

| | | | |
|---|---|---|---|
| 1,668,295 | 5/1928 | Weinhardt | 180—85 |
| 2,226,047 | 12/1940 | Borgward | 180—73 |
| 2,775,467 | 12/1956 | Kraus et al. | 180—73 |
| 2,811,214 | 10/1957 | Uhlenhaut et al. | 180—73 |
| 3,002,580 | 10/1961 | Mueller et al. | 180—73 |
| 3,163,440 | 12/1964 | Vail | 280—80 |
| 3,174,771 | 3/1965 | Muller | 180—73 X |
| 3,189,118 | 6/1965 | Arning | 180—73 |

FOREIGN PATENTS

| | | |
|---|---|---|
| 876,280 | 8/1961 | Great Britain. |
| 893,409 | 4/1962 | Great Britain. |
| 898,808 | 6/1962 | Great Britain. |

A. HARRY LEVY, *Primary Examiner.*

BENJAMIN HERSH, *Examiner.*

E. E. PORTER, *Assistant Examiner.*